United States Patent [19]

Huang

[11] Patent Number: 4,919,868

[45] Date of Patent: Apr. 24, 1990

[54] PRODUCTION AND SINTERING OF REACTION BONDED SILICON NITRIDE COMPOSITES CONTAINING SILICON CARBIDE WHISKERS OR SILICON NITRIDE POWDERS

[75] Inventor: Jow-Lay Huang, Troy, Mich.

[73] Assignee: Champion Spark Plug Company, Toledo, Ohio

[21] Appl. No.: 175,905

[22] Filed: Mar. 31, 1988

[51] Int. Cl.$^5$ .............................................. C04B 35/58
[52] U.S. Cl. ....................... 264/65; 501/89; 501/92; 501/97
[58] Field of Search ...................... 264/65; 501/95, 89, 501/92, 97

[56] References Cited

U.S. PATENT DOCUMENTS

| | | | |
|---|---|---|---|
| 4,285,895 | 8/1981 | Mangels et al. | 264/65 |
| 4,351,787 | 9/1982 | Martinengo et al. | 264/65 |
| 4,356,136 | 10/1982 | Mangels | 264/65 |
| 4,500,482 | 2/1985 | Huther | 264/65 |
| 4,687,655 | 8/1987 | Hunold et al. | 423/344 |

FOREIGN PATENT DOCUMENTS

| | | | |
|---|---|---|---|
| 60-200863 | 10/1985 | Japan | 501/95 |
| 717555 | 8/1952 | United Kingdom . | |

OTHER PUBLICATIONS

Lundberg et al., Am. Ceram. Soc. Bull., 66 (2) 330–333 (1987).

*Primary Examiner*—James Derrington
*Attorney, Agent, or Firm*—Macmillan, Sobanski & Todd

[57] ABSTRACT

A method for producing a sintered reaction bonded silicon nitride ceramic reinforced with silicon carbide whiskers is disclosed. The method comprises mixing powdered silicon having an average particle size not greater than 5 $\mu$m with from 3 to 7 percent each of MgO and CeO$_2$ and from 10 to 35 percent of silicon carbide whiskers, from 15 to 50 percent of silicon nitride or from 10 to 35 percent of silicon carbide whiskers and from 15 to 50 percent of silicon nitride, pressing a shape from the resulting mixture, and heating the shape in a nitrogen atmosphere at a pressure of about 1 atmosphere absolute. The MgO and CeO$_2$ serve as sintering aids. Other suitable sintering aids include 2 to 8 percent of Y$_2$O$_3$, 6 percent of Y$_2$O$_3$ and 2 percent of Al$_2$O$_3$, 2 to 8 percent of MgO, BeO, HfO$_2$ or ZrO$_2$ and 1 to 5 percent of CaO. The heating of the ground shape is controlled, until a temperature is reached at which it has previously been determined that the consumption of nitrogen by reaction between silicon of the shape and nitrogen is complete so that reaction between nitrogen and the shape is substantially complete at any given temperature before the shape is heated above that temperature, and therafter the shape is heated rapidly to produce, by reaction involving the sintering aid, a sufficient amount of a glass to produce a Si$_3$N$_4$ body having from 65 to 85 percent of theoretical density.

2 Claims, No Drawings

PRODUCTION AND SINTERING OF REACTION BONDED SILICON NITRIDE COMPOSITES CONTAINING SILICON CARBIDE WHISKERS OR SILICON NITRIDE POWDERS

DEFINITIONS

As used herein, and in the appended claims, the terms "percent" and "parts" refer to percent and parts by weight, unless otherwise indicated; g means gram or grams; mg means milligram or milligrams; m means meter or meters; cm means centimeter or centimeters; mm means millimeter or millimeters; both micron and $\mu$m mean $10^{-6}$ meter; 1 means liter or liters; psi means pounds per square inch; and MPa means $10^6$ Pascals.

All temperatures herein are in degrees C., unless otherwise indicated.

BACKGROUND OF THE INVENTION

1. Field of the Invention

This invention relates to the production of a silicon nitride ceramic which contains silicon carbide whiskers, silicon nitride powders, or both by a method which includes a reaction bonding step and a sintering step.

2. The Published Art

U.S. Pat. No. 4,356,136, granted Oct. 26, 1982 to Mangels, discloses that a reaction bonded silicon nitride ceramic (without silicon carbide whiskers) can be packed in silicon nitride powder and a densification aid, and densified by a two step firing procedure in a nitrogen atmosphere. The first step is in a low pressure nitrogen atmosphere while the second is in a high pressure nitrogen atmosphere. Example 1 of the patent discloses a first step firing in 15 psi. nitrogen to 1875° C. and a second step firing in 300 psi. nitrogen to 1925° C.

U.S. Pat. No. 4,351,787, granted Sept. 28, 1982 to Martinengo et al., discloses that a shape can be pressed from a mixture of silicon particles and a sintering aid (again, without silicon carbide Whiskers), that the shape can be nitrided to produce a reaction bonded shape, and that the reaction bonded shape, after it has been embedded in a protective powder can be densified y firing in a nitrogen atmosphere. In Example 1, the protective powder is composed of $Si_3N_4$, BN, MgO and Fe and the firing is to 1800° C., final nitrogen pressure 750 Torr.

U.S. Pat. No. 4,687,655, granted Aug. 18, 1987 to Hunold et al., discloses (Example 6) that ceramics which do not include silicon carbide whiskers, but having a silicon nitride content of 99.1 percent, 98 percent of theoretical density, can be produced by cold isostatic pressing of a mixture of silicon powder, yttrium oxide powder and aluminum oxide powder, and subjecting the shapes which are produced to a two-stage firing in a high pressure nitrogen atmosphere. The first stage of the firing was to a maximum temperature of 1270°, nitrogen pressure from 50 to 80 MPa, while the second stage was to a maximum temperature of 1800°, nitrogen pressure from 80 to 150 MPa. The patent also states that cycles comparable to the Examples would last from 100 to 140 hours in the case of nitridation with nitrogen or nitrogen/hydrogen mixtures under normal pressure.

Various suggestions have also been made or ceramic composites which include silicon carbide whiskers. For example, composites comprising $Si_3N_4$ reinforced with SiC whiskers are disclosed by Lundberg et al., *Am. Ceram. Soc Bull.*, 66 [2]330–33 (1987). The Lundberg et al. reference discloses production of the composites by cold isostatic pressing of a batch to produce bars, nitridation of the bars, and sintering of the nitridated bars. The batch was composed of from 70 to 100 percent of a matrix material and up to 30 percent of SiC whiskers. The matrix material was composed of 55 percent of submicrometer Si, 37 percent of $Si_3N_4$, 6 percent of $Y_2O_3$ and 2 percent of $Al_2O_3$. A two-step nitridation was used, 1 hour at 1200° followed by 3 hours at 1350°. The nitrided bars were were either pressureless sintered at 1850° or hot isostatically pressed in argon at 1700°.

It has also been suggested (see, for example, U.S. Pat. No. 4,500,482, granted Feb. 19, 1985) that a mixture of silicon, silicon nitride and an organic binder (without silicon carbide whiskers) can be molded to a desired shape, nitrided, and hot isostatically pressed to produce a silicon nitride ceramic (see, for example, GB PS 1,546,928, May 31, 1979) and that a molding (without silicon carbide whiskers) can be produced from silicon powder and sintered in an inert atmosphere to 60-75 percent of theoretical density prior to nitriding to form silicon nitride.

BRIEF DESCRIPTION OF THE INSTANT INVENTION

The instant invention is a method for producing a sintered reaction bonded silicon nitride composite which is reinforced with silicon carbide whiskers, which contains silicon nitride particles, or both. The method comprises mixing powdered silicon having an average particle size not greater than 5$\mu$m and silicon carbide whiskers, silicon nitride particles or silicon carbide whiskers and silicon nitride particles with a suitable amount of a sintering aid, pressing a shape from the resulting mixture, heating the shape in a nitrogen atmosphere to effect reaction bonding, and sintering the shape. Preferably, the pressed shape is calcined and ground to a desired contour, and it is the ground shape that is heated in a nitrogen atmosphere to effect reaction bonding; the nitrogen atmosphere in which the shape is heated to effect reaction bonding is at a pressure of about 1 atmosphere absolute; the silicon carbide whiskers constitute from about 10 to 35 percent of the batch, the silicon nitride constitutes from about 15 to 50 percent of the batch, or silicon carbide whiskers constitute from about 10 to 35 percent and silicon nitride constitues from about 15 to 50 percent of the batch; and heating is controlled, until a temperature is reached at which it has previously been determined that the consumption of nitrogen by reaction between silicon of the shape and nitrogen is complete, so that reaction between nitrogen and the shape is substantially complete at any given temperature before the shape is heated above that temperature, and thereafter the shape is heated rapidly to produce, by reaction involving the sintering aid, a sufficient amount of a glass to produce a $Si_3N_4$ body having from 65 to 85 percent of theoretical density. The sintering aid, most desirably, is 3 to 7 percent each of MgO and $CeO_2$, but can also be 2 to 8 percent of $Y_2O_3$, 6 percent of $Y_2O_3$ and 2 percent of $Al_2O_3$, 2 to 8 percent of MgO, BeO, $HfO_2$ or $ZrO_2$, or 1 to 5 percent of CaO.

DESCRIPTION OF THE PREFERRED EMBODIMENTS

The invention will be more fully understood from the following Examples, which constitute the best modes presently contemplated by the inventor.

EXAMPLE 1

Silicon nitride composites were produced from powdered silicon, MgO, CeO$_2$ and silicon carbide whiskers. The powdered silicon used is commercially available under the designation "Kemanord II C (8μm)", assay 0.43 percent Fe; it had previously been dry milled for fifteen hours with 0.2 percent triethanolamine to an average particle size of 4μm, range 2-20 μm. The MgO is commercially available under the designation "Baikowski M30CR high surface"; the CeO$_2$ under the designation "Rhone Poulenc Opaline Ground"; and the silicon carbide whiskers under the designation "Tateho 1-S105".

A charge made up of 550g of the silicon, 38g of the MgO, 38g of the CeO$_2$, and 950ml anhydrous ethyl alcohol was milled for four hours in a jar mill and the slurry from the mill was dried by distilling the ethanol from a rotating, evacuated flask. A slurry was then produced by manual mixing of a 72g portion of the dried charge with 350ml anhydrous ethyl alcohol and 0.44ml polyethyleneimine dispersant which is commercially available from Polyscience, Inc.; after ultrasonic vibration for about 4 minutes to break down agglomerates, the slurry was mixed in a low-speed, low-sheer blender with (1) a composition composed of 2g ceramic binder that is available from The Dow Chemical Company under the designation Dow XU54030300, 1.3 g polyethylene glycol 400 and 200ml ethyl alcohol, and (2) a silicon carbide whisker slurry produced as described below.

The resulting slurry was then dried by distilling the ethyl alcohol and the dispersant from a rotating, evacuated flask. Cylindrical shapes about 19mm in diameter and 51 mm in length were then pressed, using an isostatic press, from the dried material, pressing pressure 30,000 psi (about 207 MPa), and were fired at 535° for one hour in a convection type air flow oven. The purpose of the firing was to burn out the binder and plasticizer.

The silicon carbide whisker slurry used as described above in producing the cylindrical shapes was produced from 250ml ethyl alcohol, 0.32g polyethyleneimine dispersant that is available commercially from Polyscience, Inc., and 28g silicon carbide whiskers that had been boiled for two hours in 5 percent hydrochloric acid and from which fine particles had then been separated by decantation. The silicon carbide whiskers were mixed with the ethyl alcohol and the dispersant, and were then disaggregated and dispersed ultrasonically for about 4 minutes.

The shapes that had been fired to 535° were then placed in a molybdenum setter which, in turn, was placed in an electrically heated furnace with a tungsten heating element; the furnace was evacuated; and the bodies were fired. The firing involved:

(1) heating to 750° at about 6° per minute, and holding at 750° for two hours, initially maintaining the vacuum in the furnace;

(2) after about 1½ hours of the hold at 750°, introducing an atmosphere composed of 71 volume percent nitrogen, 25 volume percent helium and 4 volume percent hydrogen into the furnace to increase the absolute pressure therein to about 1.1 atmospheres, and applying an atmosphere of this composition to the furnace to maintain the indicated pressure;

(3) at the end of the hold at 750°, and thereafter throughout the remainder of the cycle, applying nitrogen (rather than the atmosphere composed of nitrogen, helium and hydrogen) to the furnace to maintain a pressure of about 1.1 atmospheres, and commencing heating to 1150° at a nominal rate of 5° per hour, but with a dwell whenever a sensor received a signal indicating an appreciable consumption of nitrogen: (4) heating to 1650° at 5° per minute as soon as the furnace temperature reached 1150° (it had previously been determined in the manner described below that reaction between the bodies and nitrogen was complete when the furnace reached 1150°);

(5) holding at 1650° for one hour; and (6) cooling at 15° per minute in the furnace.

The resulting composites were found to have densities which were about 75 percent of the theoretical density, and to be composed of silicon carbide whiskers, sintered reaction bonded silicon nitride, iron silicide, about 0.2 percent of residual silicon, fosterite, CeSiO$_2$N and a small amount of a ceria-magnesia silicate glass. They were admirably suited for use as structural ceramics because they had excellent strength properties and resistance to thermal shock. For example, they had a four point bend strength of 58,000 psi.

The bodies produced as described above in Example 1 had a nominal silicon carbide whisker content of 20 percent and a nominal silicon nitride content of 80 percent, disregarding the glass, the silicon, and other secondary phases. The method has also been used to produce other bodies. Examples of batch compositions are identified in percent, disregarding the glass-forming ingredients, in the following table:

| Example No. | Silicon | Silicon Nitride[1] | Silicon Carbide Whiskers | Four Point Bend Strength RB[2] | SRB[3] |
|---|---|---|---|---|---|
| 2 | 88 | — | 12 | 32,000 | 73,000 |
| 3 | 35 | 50 | 15 | 54,000 | — |
| 4 | 80 | — | 20 | 24,000 | 58,000 |
| 5 | 25 | 50 | 25 | 33,000 | — |
| 6 | 15 | 50 | 35 | 25,000 | — |
| 7 | 50 | 50 | — | — | 84,000 |
| 8 | 70 | — | 30[4] | — | 39,000 |
| Control | 100 | — | — | 78,000 | 89,000 |

[1] The silicon nitride used is available under the designation Starck LC-10; it has an average particle size of about 1–2μm.
[2] Reaction bonded, i.e., without sintering.
[3] Sintered and reaction bonded.
[4] The silicon carbide whiskers used in the procedure of Example 8 are available under that name from American Matrix.

The furnace temperatures at which reaction between nitrogen and the silicon was complete in the procedures of Examples 2–8 and in the foregoing control were as follows: Example 2, 1290°; Example 3, 1125°; Example 4, 1150°; Example 5, 1135°; Example 6, 1210°; Example 7, 1100°; Example 8, 1145°; Control, 1345°.

It is known that the toughness and thermal properties of silicon nitride bodies are dramatically improved by the incorporation therein of silicon carbide whiskers. Accordingly, it will be appreciated that bodies produced as described in the foregoing Examples are admirably suited for structural applications.

As is stated above in Example 1, "it had previously been determined in the manner described below that reaction between the bodies and nitrogen was complete when the furnace reached 1150°". This determination was made by carrying out the procedure of Example 1 except that, after the hold at 750°, the furnace was heated to 1300° at a nominal rate of 5° per hour, but with a dwell whenever a sensor received a signal indicating an appreciable consumption of nitrogen, and monitoring the consumption of nitrogen. It was found that there was a substantial dwell at 1125° to 1150° during which about 50 percent of the total nitrogen used was consumed and that no nitrogen was consumed as the furnace was heated from 1150° to 1300°. Accordingly, in the Example 1 procedure, reaction between the bodies and nitrogen was deemed complete when the furnace reached 1150°.

For purposes of comparison, the procedure described in the preceding paragraph was repeated, except that the polyethyleneimine dispersion of silicon, MgO and CeO$_2$ was dried by distilling the dispersant from a rotating, evacuated flask, and the cylindrical shapes about 19 mm in diameter and 51 mm in length, were pressed from the dried material without an addition of silicon carbide whiskers. It was found that only about 60 percent of the total nitrogen consumption had occurred when the furnace temperature reached 1150°, about 77 percent when the furnace temperature reached 1200°, and about 83 percent when the furnace temperature reached 1250°. Consumption of nitrogen was not complete until the furnace temperature reached substantially 1345°.

The MgO-CeO$_2$ sintering aid in composites produced as described in the foregoing example was highly advantageous because it reacted during firing to produce a small amount of a magnesium-cerium silicate (nitrogen) glass, which was liquid at the 1650° firing temperature. A dense body was, therefore, produced as a consequence of liquid phase sintering. The liquid nitrogen glass was also able to flow into the interstices in the body (composed of the reaction bonded silicon nitride and the silicon carbide whiskers) so that, when it solidified during cooling, porosity was reduced, and possible sites of crack initiation were eliminated. The firing temperature of 1650° was determined experimentally to be optimum for the composite composition of Example 1; this was done by producing ceramics by the same method, but using maximum firing temperatures of 1550°, 1600°, 1650°, 1700° and 1750°, and determining the densities of the ceramics that were produced. The indicated temperature was selected as optimum on the basis of the properties of the ceramics produced at these firing temperatures, which had been selected from phase considerations.

Silicon nitride particles were incorporated in several of the foregoing examples, either in addition to or in place of silicon carbide whiskers. It has been found that silicon nitride, in both cases, increases the permeability of the bodies to nitrogen during firing, and also absorbs some of the exothermic heat that is released locally during firing. For example, nitriding of bodies produced as described in Example 1, from a batch containing 15 percent of silicon carbide whiskers[5], 35 percent of silicon and 50 percent of silicon nitride, was found to be complete at 1125°, and from a batch containing 25 percent of silicon carbide whiskers[3], 25 percent of silicon and 50 percent of silicon nitride, was found to be complete at 1135°.

Covering powders can also be used in sintering reaction bonded silicon nitride composites to prevent the decomposition of silicon nitride and loss of liquid. Preferably, the covering powder has the same composition as the body being sintered. It has b ⓇⓇn found that the bulk density can be increased by 5 to 15 percent, depending upon the content of silicon carbide whiskers, by using a covering powder during sintering, the increase being by comparison with that achieved by sintering as described in Example 1, above.

It will be appreciated that the method is also operable when other sintering aids are substituted for the MgO and CeO$_2$, which can be replaced, for example, by 2 to 8 percent of Y$_2$O$_3$, by 6 percent of Y$_2$O$_3$ and 2 percent Al$_2$O$_3$, by 2 to 8 percent of MgO, by 2 to 8 percent of BeO, by 2 to 8 percent of HfO$_2$, by 2 to 8 percent of ZrO$_2$, or by 1 to 5 percent of CaO. It will be appreciated that a different firing temperature will be optimum when the sintering aid is different, in composition, in proportion, or both. The optimum temperature should be determined experimentally in the manner described above for any new composition. The experimental temperatures can be selected on the basis of phase considerations, or a relatively wide range of temperatures can be investigated.

It has been found that the small amount of iron in the silicon starting material used in practicing the method described in the foregoing Example is advantageous, because it acts as a catalyst for the removal of SiO$_2$ from the composites, about 0.2 to 0.6 percent thereof being desirable in the batch. Fe$_2$O$_3$ (or NiO) can also be used to catalyze the removal of SiO$_2$ without degrading the silicon carbide whickers, the amount required being that which introduces about 0.2 to 0.6 percent of Fe. The Fe or Fe$_2$O$_3$ in a batch used to produce a composite as described above is present in the composite as iron silicide, which forms during the last stage of the nitridation process.

It will be appreciated that various changes and modifications can be made from the details of the instant invention as described above without departing from the spirit and scope thereof as defined in the appended claims and that, in its essential details, the invention is a method for producing a sintered reaction bonded silicon nitride ceramic reinforced with silicon carbide whiskers, which method comprises mixing powdered silicon having an average particle size not greater than 5μm with silicon carbide whiskers, and a suitable amount of a sintering aid. pressing a shape from the resulting mixture, and heating the ground shape in a nitrogen atmosphere at a pressure of about 1 atmosphere absolute. The sintering aid, most desirably, is 3 to 7 percent each of MgO and CeO$_2$, but can also be 2 to 8 percent of Y$_2$O$_3$, 6 percent of Ye$_2$O$_3$ and 2 percent of Al$_2$O$_3$, 2 to 8 percent of MgO, BeO, HfO$_2$ or ZrO$_2$, or 1 to 5 percent of CaO. The heating of the ground shape is controlled, until a temperature is reached at which it has previously been determined that the consumption of nitrogen by reaction between silicon of the shape and nitrogen is complete, so that reaction between nitrogen and the shape is substantially complete at any given temperature before the shape is heated above that temperature, and, thereafter, the shape is heated rapidly to produce, by reaction involving the sintering aid, a sufficient amount of a glass to produce a Si$_3$N$_4$ body having from 65 to 85 percent of theoretical density. Preferably, from about 1 to 10 volume percent of hydrogen is introduced into the furnace at the beginning of the firing cycle. Preferably, also, from about 20 to 30 volume percent of helium is introduced into the furnace at the beginning of the firing cycle.

I claim:

1. A method for producing a sintered reaction bonded silicon nitride composite which contains silicon nitride, ---
[5] Based upon the weight of the silicon nitride charged and of that produced from the silicon charged.

is reinforced with silicon carbide whiskers, or both, which method comprises mixing powdered silicon having an average particle size not greater than 5 μm with a suitable amount of a sintering aid and
  (a) from 10 to 35 percent of silicon carbide whiskers,
  (b) from 15 to 50 percent of silicon nitride, or
  (c) from 10 to 35 percent of silicon carbide whiskers and from 15 to 50 percent of silicon nitride,
pressing a shape from the resulting mixture, heating the shape in a nitrogen atmosphere at a pressure of about 1 atmosphere absolute, and controlling the heating rate:
  (d) until a predetermined temperature is reached, so that reaction between nitrogen and the shape is substantially complete at any given temperature before the shape is heated above that temperature, the predetermined temperature being one at which it has previously been determined that the consumption of nitrogen by reaction between silicon of the shape and nitrogen is complete when the heating is conducted so that reaction between nitrogen and the shape is substantially complete at any given temperature before the shape is heated above that temperature, and
  (e) thereafter heating the shape rapidly from said predetermined temperature to a temperature sufficiently high to produce, by reaction involving the sintering aid, a sufficient amount of a glass to produce a $Si_3N_4$ body having from 65 to 85 percent of theoretical density,
wherein the suitable amount of a sintering aid is from 3 to 7 percent each of MgO and $CeO_2$, 2 to 8 percent of $Y_2O_3$, 6 percent of $Y_2O_3$ and 2 percent of $Al_2O_3$, 2 to 8 percent of MgO, BeO, $HfO_2$ or $ZrO_2$, or 1 to 5 percent of CaO.

2. A method as claimed in claim 1 wherein the sintering aid is from 3 to 7 percent each of MgO and $CeO_2$, and the firing to complete the reaction between nitrogen and the ground shape is to a maximum temperature of about 1150°.

* * * * *